(12) United States Patent
Yamabe

(10) Patent No.: US 6,877,756 B2
(45) Date of Patent: Apr. 12, 2005

(54) FOLDING BICYCLE

(75) Inventor: Hideyasu Yamabe, Osaka (JP)

(73) Assignee: Atras Auto Co., Ltd., Osaka (JP)

( * ) Notice: Subject to any disclaimer, the term of this patent is extended or adjusted under 35 U.S.C. 154(b) by 0 days.

(21) Appl. No.: 10/674,968

(22) Filed: Sep. 30, 2003

(65) Prior Publication Data

US 2004/0066019 A1 Apr. 8, 2004

(30) Foreign Application Priority Data

Oct. 8, 2002 (JP) ........................... 2002-294338

(51) Int. Cl.⁷ ............................................. B62K 3/02
(52) U.S. Cl. ................................. 280/287; 280/278
(58) Field of Search ............................ 280/287, 278, 280/281.1, 284, 288

(56) References Cited

U.S. PATENT DOCUMENTS

| | | | | |
|---|---|---|---|---|
| 1,610,016 A | * | 12/1926 | Kuchta | 280/278 |
| 1,703,174 A | * | 2/1929 | Roe | 280/261 |
| 3,623,749 A | * | 11/1971 | Jensen | 280/278 |
| 3,979,136 A | | 9/1976 | Lassiere | |
| 4,824,130 A | * | 4/1989 | Chiu | 280/239 |
| 4,955,628 A | | 9/1990 | Chiu | |
| 5,785,338 A | | 7/1998 | Chang | |
| 6,695,334 B1 | * | 2/2004 | Irlbacher | 280/278 |
| 6,702,312 B1 | * | 3/2004 | Miksik | 280/287 |
| 2002/0185836 A1 | | 12/2002 | Irlbacher | |

FOREIGN PATENT DOCUMENTS

| | | | |
|---|---|---|---|
| DE | 202 06 975 | 7/2002 | |
| EP | 0505598 | 9/1992 | |
| ES | 1036800 | 11/1997 | |
| FR | 2818233 | 6/2002 | |
| JP | 3-54088 | * 3/1991 | ........... B62K/15/00 |

* cited by examiner

Primary Examiner—Avraham Lerner
(74) Attorney, Agent, or Firm—D. Peter Hochberg; Sean Mellino; Katherine R. Vieyra

(57) ABSTRACT

A folding bicycle, wherein a head pipe is pivotally supported on the front end of a main frame so as to freely rotate, a handle shaft for rotatably supporting a front wheel is supported while being inserted into the head pipe, a rear wheel is rotatably supported on the rear end of the main frame, a saddle post having a saddle on the top end is pivotally supported on the rear side of a pivotal-support portion of the head pipe, a stay having the top end detachably fixed on the saddle post is pivotally supported on the front side of the rear wheel of the main frame, a crank gear is rotatably supported between a pivotal-support portion of the saddle post and a pivotal-support portion of the stay, a chain is looped over the crank gear and a small gear provided on the rear wheel, and the stay, the saddle post and the handle shaft can be folded so as to be overlaid one another along the main frame.

5 Claims, 23 Drawing Sheets

FOLDING BICYCLE

FIELD OF THE INVENTION

The present invention relates to a folding bicycle.

BACKGROUND OF THE INVENTION

A "bicycle" appearing in the tile of the invention is designed as a substantial "bicycle". In particular, the "bicycle" of the invention is meant to include not only "bicycles" of the original meaning, but those two-wheeled vehicles that are not named "bicycle" because their wheels have diameters smaller than the minimum diameter required for wheels of standardized bicycles, or because they are provided with a power drive. The term "bicycle" thus meant is used throughout the specification and claims of this patent application.

As described in JP2001-328581A and JP2001-278160A, a number of folding bicycles, which can be folded small and preferably stored when not being used, have been proposed and introduced on the market.

Many of these folding bicycles have body frames, each being foldable between a front wheel and a rear wheel. When a folded part is assembled, in order to provide durability even when more than a certain weight is applied, the strength of the whole body is maintained by firmly tightening a special metal fitting upon assembling.

Further, other bicycles have foldable saddle posts and foldable stays for supporting the saddle posts. In order to provide these foldable parts with durability even when more than a certain weight is applied, the strength of the whole body is similarly maintained by firmly tightening special metal fittings upon assembling.

Therefore, the bodies become heavier and complicated operations are necessary during assembling and folding, posing a problem such that convenient use is difficult.

DISCLOSURE OF THE INVENTION

The present invention has an object to solve the above problem by making an improvement to the folding bicycle to provide a folding bicycle that can be folded small when being folded, can be readily assembled and folded with simple operations, can run with improved stability, particularly with improved straight running stability of a bicycle, and can offer a comfortable riding.

A folding bicycle of the present invention comprises: a head pipe pivotally supported with respect to a main frame of a rod shape at the front end of the main frame so as to be rotatable in a plane including the main frame; a front wheel fork and a handle shaft each inserted into and supported by the head pipe; a rear wheel rotatably supported on the rear end of the main frame; a saddle post having a saddle on the top end thereof and pivotally supported on a rear side of a pivotal-support portion of the head pipe; a stay having a top end detachably fixed to the saddle post and pivotally supported on a front side of the rear wheel of the main frame; a crank gear rotatably supported between the pivotal-support portion of the saddle post and the pivotal-support portion of the stay; and a loop drive member looped over the crank gear and a small gear provided on the rear wheel, wherein the stay, the saddle post, and the handle shaft can be folded to be overlaid on one another along the main frame.

In this folding bicycle, the main frame is a single rod and there is no hinge portion to be folded in an intermediate part. Thus, it is not necessary to particularly consider a reinforcing structure of a folded portion, resulting in a simple configuration and weight reduction. Further, the folded portions are only the rotatably supported portions with respect to the main frame, of the saddle post, the stay, and the handle shaft, so that the folding can be performed with simple operations. Moreover, since all these members are folded along a single main frame, a folded-state shape can be smaller.

Further, when the stay is attached and detached to and from the saddle post via a suspension mechanism, it is possible to achieve preferable cushioning characteristics and comfortable riding.

BRIEF DESCRIPTION OF THE DRAWINGS

FIG. 14b is an explanatory view showing a folded state of the folding bicycle of FIG. 14a.

DESCRIPTION OF THE EMBODIMENTS

Embodiments of the present invention will be discussed below.

Embodiment 1

Figure 1A:
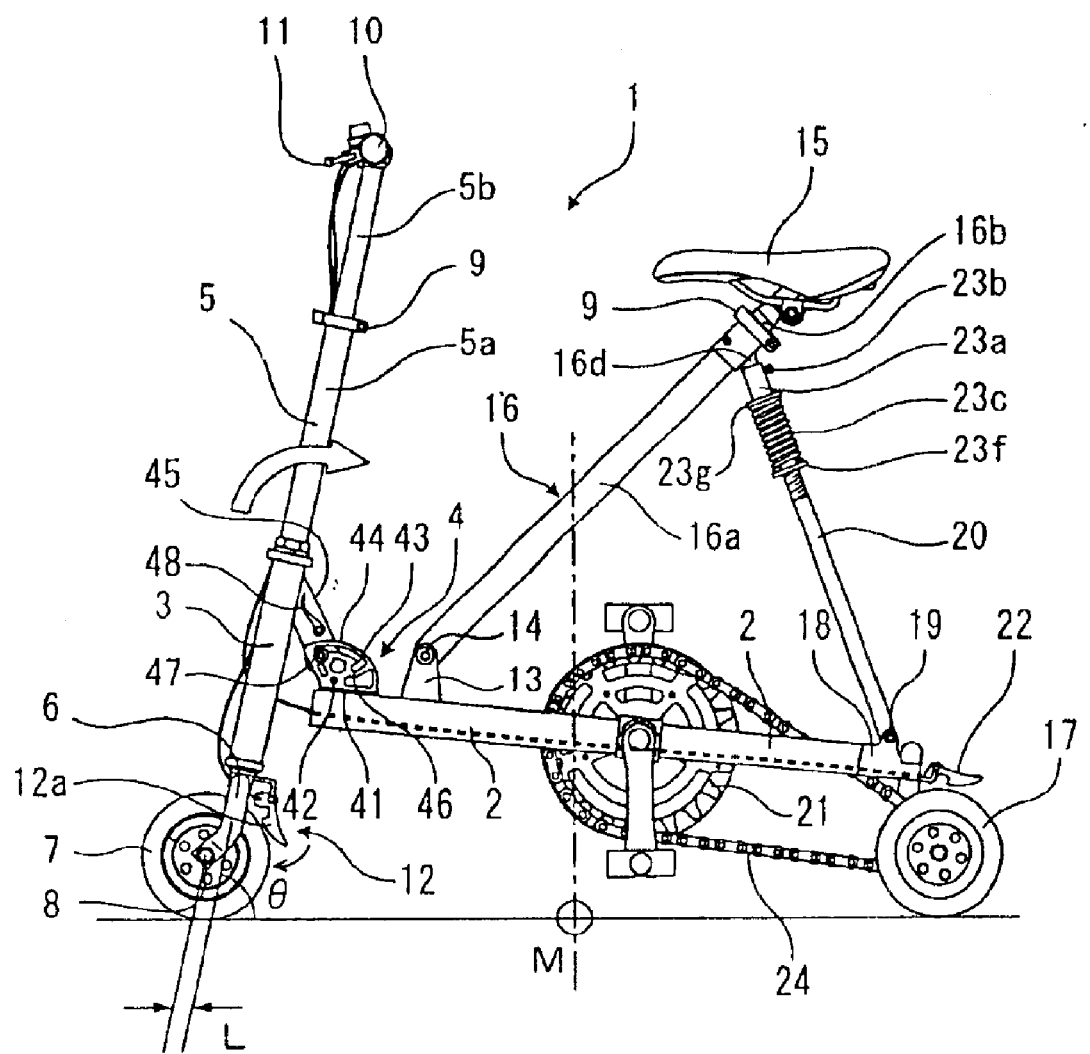
FIG. 1a is a side view showing a folding bicycle according to Embodiment 1, in which a hinge part has a notch in a single stage.

As shown in FIG. 1a, a folding bicycle 1 has a head pipe 3 on the front end of a main frame 2 shaped like a rod. As indicated by an arrow, the head pipe 3 can be freely rotated by a hinge member 4 inside a surface including the main frame 2.

The hinge member 4 has guide plates 44 raised so as to be opposed to each other on both sides of a base 41 mounted on a surface of the main frame 2. The guide plate 44 has a guide groove 43 along the periphery having a pivot point 42 at the center. A supporting arm 45 is pivotally supported between the guide plates 44 so as to rotate about the pivot point 42.

The head pipe 3 is integrally attached to the end of the supporting arm 45 by welding and so on.

Then, notches 46 are formed on both ends of the guide groove 43 of the guide plate 44, and a pin 47 guided along the guide groove 43 is provided on the side of the supporting arm 45. The attitude of a handle shaft 5 can be adjusted by resiliently fitting the pin 47 into the notch 46.

In the figure, reference numeral 48 denotes an operation lever which takes out the pin 47 from the notch 46. As shown in an enlarged partial view of FIG. 2a, a scooping arm 47a making contact with the pin 47 is extended in the diameter direction on the rotary shaft 48a of the operation lever 48. When the lever 48 is rotated in the direction of the arrow of the figure, the pin 47 is scooped by the end of the scooping arm 47a, is moved along an oblong hole 49, and comes out of the notch 46, so that the supporting arm 45 can freely rotate about the shaft 42.

Figure 2A:
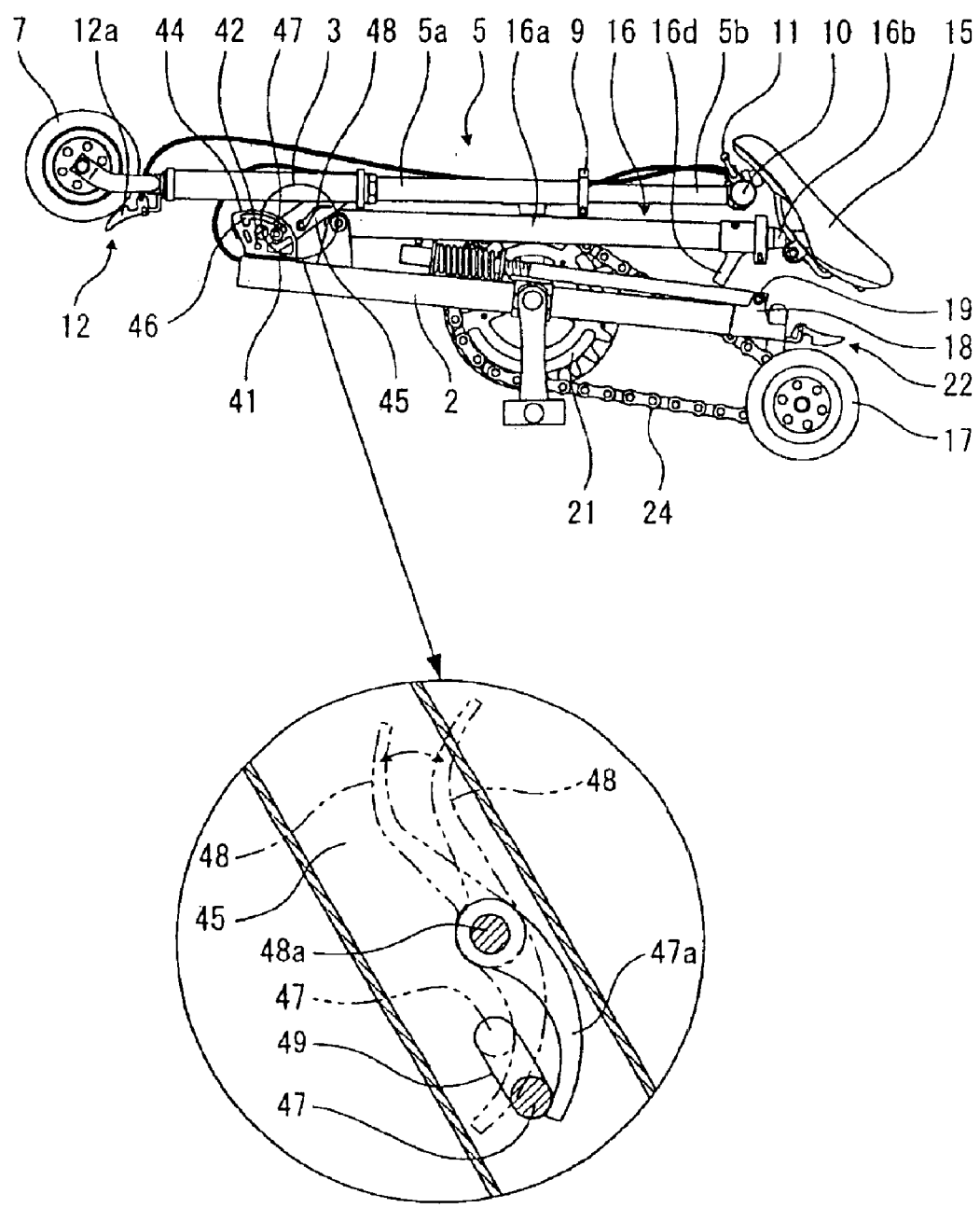
FIG. 2a is a side view showing the folded state of the folding bicycle in Embodiment 1.
Figure 2B:
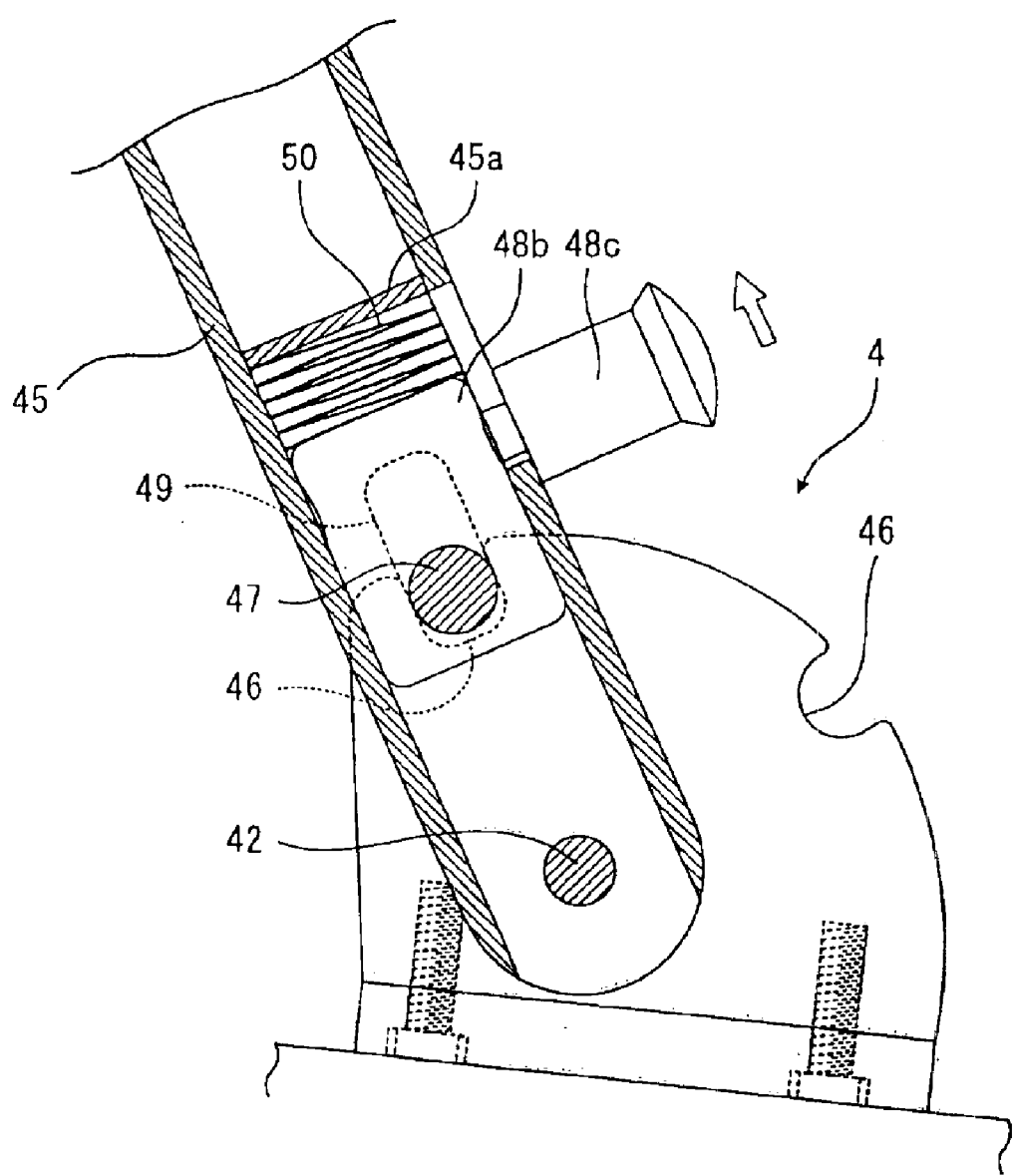
FIG. 2b is a partially sectional view showing another structural example of the hinge part for a handle shaft of the folding bicycle in Embodiment 1.

As a mechanism for engaging and disengaging the pin 47 to and from the notch 46, the mechanism shown in FIG. 2b is also applicable.

Namely, the following mechanism may be used: a slider 48b is provided in the supporting arm 45 so as to freely slide along the longitudinal direction of the supporting arm 45, the pin 47 fit into the notch 46 is protruded on a side of the slider 48b, and the pin 47 is protruded from an oblong hole 49 formed on a side of the supporting arm 45, an operation knob 48c is protruded on the slider 48b on the other hand, the operation knob 48c is protruded from the inside surface of the supporting arm 45, a spring 50 is interposed between the slider 48b and a stopper 45a provided in the supporting arm 45, the slider 48b is urged in the direction of the notch 46 all the time, and the operation knob 48c is moved in the direction of an arrow against urging force of the spring 50, so that the pin 47 is disengaged from the notch 46, the supporting arm 45 is freely rotated, and engagement is made to the notch 46 again by the urging force of the spring 50.

Figure 1B:
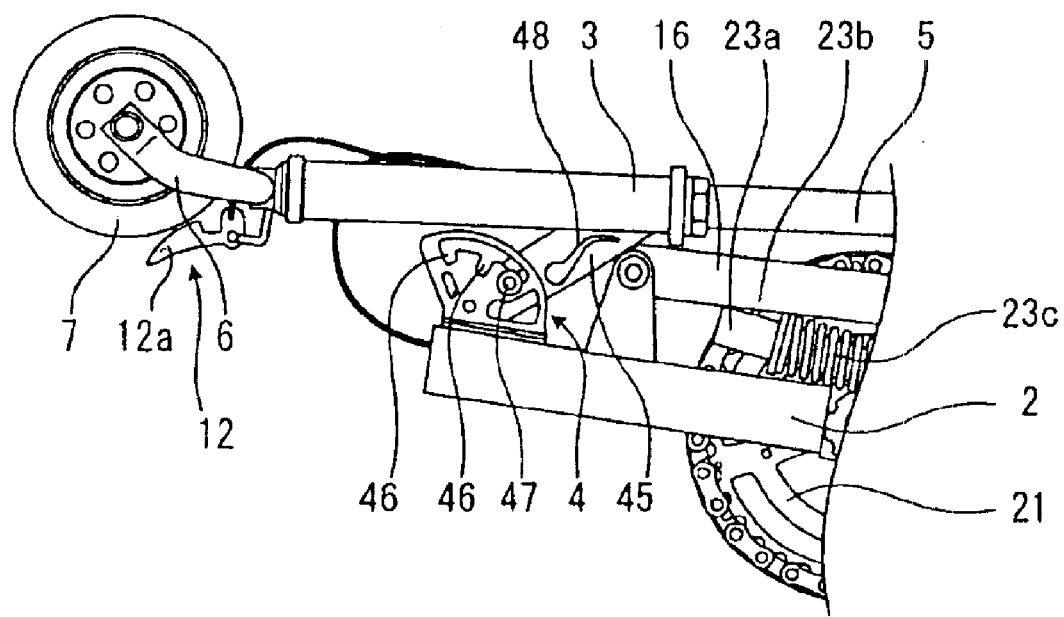
FIG. 1b is a side view showing a main part of a folded part of the folding bicycle according to Embodiment 1, in which a hinge part has a notch in two stages.

FIG. 1b shows another structural example of a pivotal-support member, in which the notch 46 is provided in two stages to select an erecting angle of the handle shaft 5. Besides, this structural example is identical to that of the folding bicycle shown in FIG. 1 except that the notch 46 is provided in two or more stages. Thus, the same parts as those of FIG. 1a are indicated by the same reference numerals and the description of the example will be omitted.

Figure 2C:
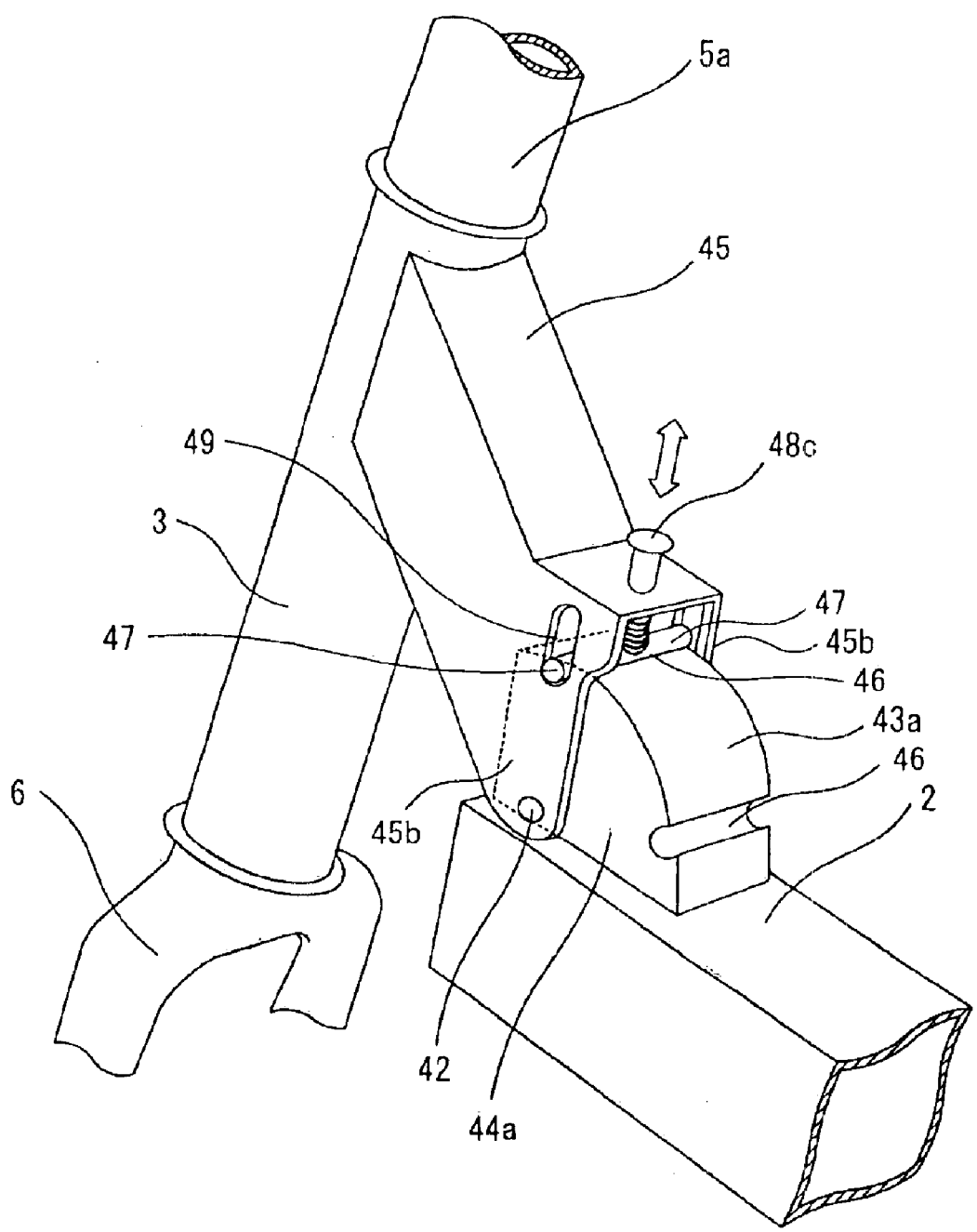
FIG. 2c is a perspective view showing a main part of the hinge part according to still another structural example in Embodiment 1.

Further, the following mechanism may be used as the hinge member, as shown in FIG. 2c: a guide block 44a having a circumferential outer surface 43a having a pivot point 42 at its center is fixed on a width-directional middle zone of a surface of a main frame 2, an oblong hole 49 is formed on each of opposing side walls 45b, 45b of a supporting arm 45 respectively for covering opposite side faces of a guide block 44a, the hole 49 extending vertically in the diameter direction of the guide block 44a with respect to the circumferential outer surface 43a, a pin 47 is provided to be movable along this oblong hole 49, and an operation knob 48c is supported on the surface of the supporting arm 45 to be protrudable with respect to the circumferential outer surface 43a so that the pin 47 is allowed to move along the oblong hole so as to be engaged in or released from the notch 46.

Next, as shown in FIG. 1a and FIG. 2a, the handle shaft 5 is supported so as to freely rotate about the shaft on the head pipe 3 which is attached on the end of the supporting arm 45, a front wheel fork 6 is supported on the lower end side of the head pipe 3, and a front wheel 7 is rotatably supported thereon. Wheels having small diameters are used as the front wheel 7 and a rear wheel 17, which contributes to compact folding. The diameters of these front and rear wheels 7, 17 may be such that they are large enough to enable the wheels to run and therefore render a vehicle with the wheels to be regarded as a bicycle, or may be such they are too small to render the vehicle with the wheels to be named a bicycle according to a certain standard.

As shown in FIG. 1a, on the front wheel fork 6, a shaft part 8 supporting the front wheel 7 on the lower end is bent forward and is provided with a fork offset L.

Further, the handle shaft 5 is also tilted backward and is provided with a caster angle θ.

The fork offset L and the caster angle θ are provided for achieving straight running stability and for preventing tottering when the wheel 7 has a small diameter.

The handle shaft 5 can expand and contract like a telescope. The handle shaft 5 has a small-diameter pipe 5b slidably fit in a large-diameter pipe 5a and a fastening member 9 provided on an opening end of the large-diameter pipe 5a to perform fastening on an arbitrary length position.

Then, a handle bar 10 is provided on the top of the handle shaft 5 so as to intersect like a letter T. Reference numeral 11 in the figure denotes an operation lever of a brake device 12 provided on the front wheel 7.

A brake shoe 12a of the brake device 12 is operated by the brake lever 11 via a cable. As shown in the figure, the brake shoe 12a is supported so as to rotate about a shaft 12b, which is placed in parallel with the rotary shaft of the front wheel, and the brake shoe 12a is contacted with the front wheel 7 by rotating in the direction opposite to the rotating direction of the front wheel 7.

When the brake shoe 12a makes contact with the front wheel 7, as indicated by an arrow, since the brake shoe 12a undergoes displacement in the direction of biting the front wheel 7, the application of the brake becomes quite effective.

Figure 3A:
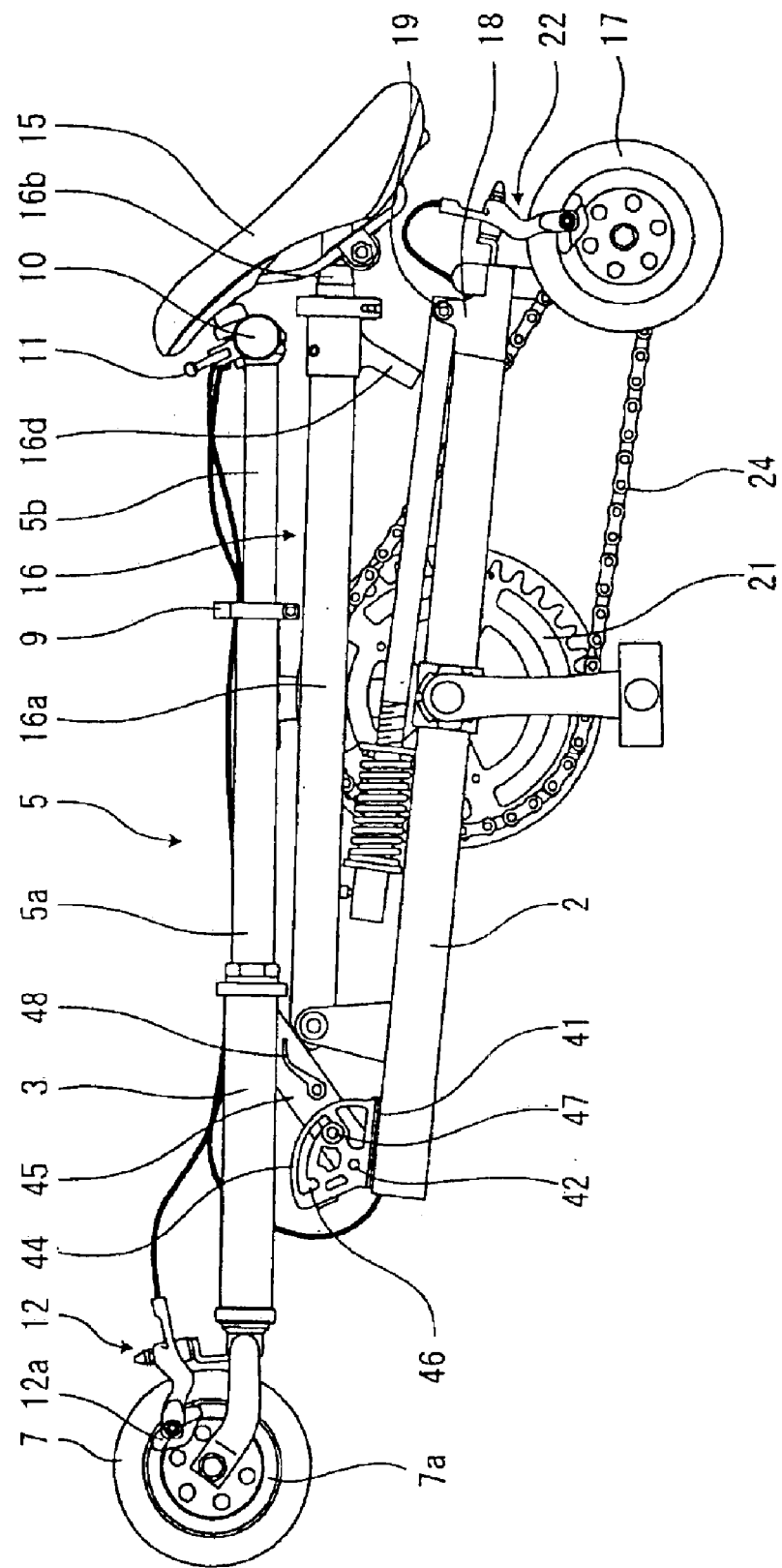
FIG. 3a is a side view showing a folded state of the folding bicycle according to another structural example in Embodiment 1.

As a configuration of the brake, configurations other than the above are also applicable. For example, a rim 7a of a tire 7 may be sandwiched by a pair of brake shoes 12a from both sides as shown in FIG. 3a, a band may be wound around the outer periphery of an axle to perform fastening (not shown), or a disk brake (not shown) may be used.

Again as shown in FIG. 1a and FIG. 1b, a shaft receiving part 13 is provided on the main frame 2 on the rear side of the hinge member 4. A saddle post 16 having a saddle 15 on the top end is pivotally supported by a rotary shaft 14 so as to have undulations with respect to the main frame 2. Besides, the saddle post 16 can also expand and contract like a telescope and has a small-diameter pipe 16b inserted into a large-diameter pipe 16a and a fastening member 9 provided on an opening end of the large-diameter pipe 16a to perform fastening on an arbitrary length position.

Further, a rear wheel 17 is rotatably supported on the rear end of the main frame 2, a shaft receiving part 18 is provided on the front side of the rear wheel 17, a stay 20 is pivotally supported on a rotary shaft 19, and the end of the stay 20 can be fixed on a lower part of the saddle 15 on the saddle post 16 so as to be freely attached and detached.

A suspension 23 is provided on the upper end of the stay 20 in the embodiment shown in FIG. 1a. A receiving part 23a is provided on the upper part of the suspension 23, and a protrusion 16d (more clearly depicted in FIG. 2a) protruding on a position corresponding to the upper end of the large-diameter pipe 16a of the saddle post 16 is fit into the receiving part 23a.

The suspension 23 is configured so that a compression spring 23c is sandwiched between a stay side flange 23f and a receiving side flange 23g. The receiving side flange 23g can slide along the stay 20 in the axial direction together with the receiving part 23. On the other hand, the stay side flange 23f is fit into the stay 20 with a screw and can adjust an axial position and spring elasticity.

Figure 3B:
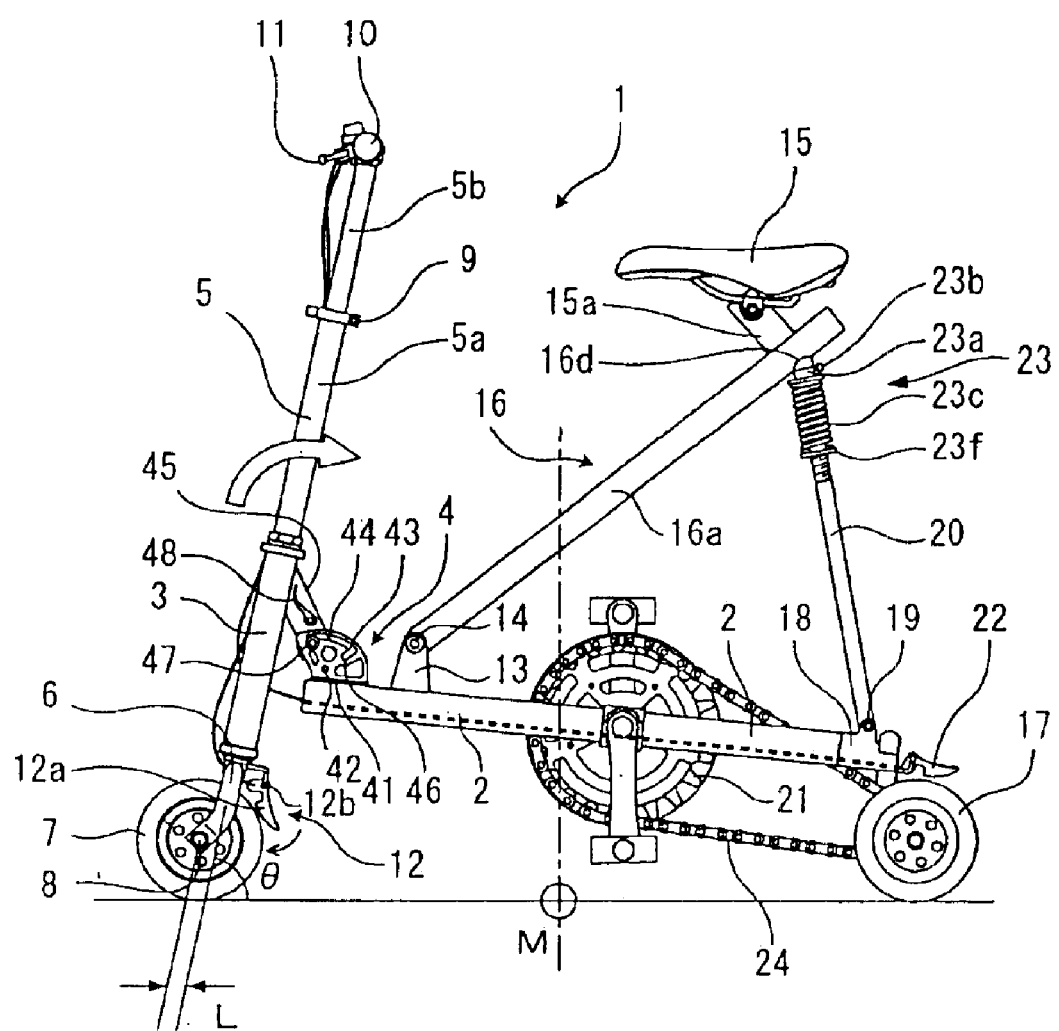
FIG. 3b is a side view showing the folding bicycle having a rear part according to another structural example of Embodiment 1.

In FIG. 3b, reference numeral 23b denotes a set screw for fastening the protrusion 16d into the receiving part 23a.

The stay 20 may be arranged, as shown in FIG. 3b, to be freely attached to and detached from an upper end portion of the saddle post 16 which has been formed to extend longer. In this illustrated case, the saddle 15 is mounted on the upper end of a support rod 15a erected on the upper end side of the saddle post 16. This arrangement is intended to prevent the saddle 15 from being mounted on the distal end of the saddle post 16 which has been inclined, because such arrangement may cause the saddle 15 to be positioned too rearward to secure easy riding and the center of gravity to be placed excessively rearward.

Further, the stay 20, which has been shown as a single rod so far, may comprise two parallel rods each having a small diameter. Although an illustration is omitted, the lower ends of these two rods are pivotally supported on opposite sides of a shaft 19 to sandwich the shaft 19 therebetween, and their upper ends are integrally connected with a bar so as to be able to attach to and detach from a protrusion 16d formed on the saddle post 16 beneath the saddle 15.

Reference numeral 22 denotes a brake device of the rear wheel 17, of which operation lever is provided on the handle bar, not shown though. The brake shoe of this brake device 22 is configured in the same manner as that of the front wheel and is contacted with the rear wheel by rotating in the direction opposite to the rotating direction of the rear wheel.

As a brake device of the rear wheel, other arrangements than the above mentioned may also be applicable. For example, the rim 7a of the tire 7 may be sandwiched by a pair of brake shoes 12a from both sides, as shown in FIG. 3a in like manner as mentioned above, a band may be wound around the outer periphery of an axle to perform fastening (not shown), or a disk brake (not shown) may be used.

Then, a crank gear 21 is rotatably supported on the main frame 2 between a pivot shaft 14 of the saddle post 16 and a pivot shaft 19 of the stay 20.

Besides, as shown in FIG. 1a, the position of attaching the crank gear 21 is placed behind a midpoint M between the shafts of the front wheel 7 and the rear wheel 17. Because of the small size of the body and the small diameter of the wheel, if the position is frontward of the midpoint M, vibration occurring in the lateral direction of the body during pedaling is transmitted to the front wheel, resulting in a meandering ride.

Further, a chain 24 is looped over the crank gear 21 and a small gear provided on the same shaft as the rear wheel 17 (hidden behind the rear wheel 17).

The chain 24 has been used as a loop drive member, but other drive members such as a rubber belt or a rubber belt with gears may be used instead. Further, although not shown, a motor or a small engine to assist or to add driving force to the rear wheel may be provided on the main frame 2 or a like member.

Next, the following will describe the using state and so on of the folding bicycle 1.

When normal riding, as shown in FIG. 1a, the handle shaft 5 is lifted up and the saddle post 16 is raised and is supported by the stay 20. The small-diameter pipe 5*b* of the handle shaft 5 is pulled out from the large-diameter pipe 5*a*, adjusted in length, and fixed by fastening the fastening member 9. The saddle post 16 is similarly adjusted in length and is fixed by the fastening member 9 at a position suitable for a body-build.

Next, the handle is held and pedaling is performed to have normal riding.

At this point, combined with the fork offset L and the caster angle θ that are provided for the front wheel 7 and a distance increased by the fork offset L and the caster angle θ between the axles of the front wheel and the rear wheel, it is possible to achieve straight running stability.

Further, since the crank gear 21 is provided on a rear position away from the front wheel within a possible range, vibration occurring in the lateral direction of the body during pedaling is less prone to being transmitted to the front wheel 7, thereby further increasing running stability.

Moreover, since the main frame 2 is formed integrally throughout the length and has no hinge member, the main frame 2 is resistant to bending and twisting and there is no possibility of unstable deformation during running.

In this embodiment, the handle shaft has no bend portion throughout its length, and therefore is resistant to twisting of the shaft, contributing to secure stability during running.

Next, when the bicycle is stored, the handle shaft 5 and the saddle post 16 are caused to contract conversely, and the stay 20 is detached from the protrusion 16*d* on the upper end of the saddle post 16. The stay 20 is laid down and the saddle post 16 is laid down so as to be overlaid thereon, as shown in FIG. 2*a*.

Additionally, since this movement is completed when the stay 20 is detached from the saddle post 16, completion is made in just a short time.

Subsequently, the lever 45 of the hinge member 4 is operated to remove the pin 47 from the notch 46, and the handle shaft 5 is laid down so as to be overlaid on the saddle post 16.

Therefore, the bicycle is folded small and can be stored in a small space. To be specific, the bicycle can be folded so as to be readily stored in a trunk of a compact car.

Besides, since the handle shaft 5 is fixed in a folded manner while the pin 47 is engaged to another notch 46, the handle shaft 5 would not lift up unless the pin 47 is detached, the saddle post 16 and the stay 20 are held by the handle shaft 5 and maintained in the folded state.

As described above, with this folding bicycle 1, good straight running stability is secured during running, and since the main frame has no hinge member, excellent strength can be achieved.

Further, since the bicycle can be folded quite small, storage can be performed with ease.

Embodiment 2

Figure 4A:
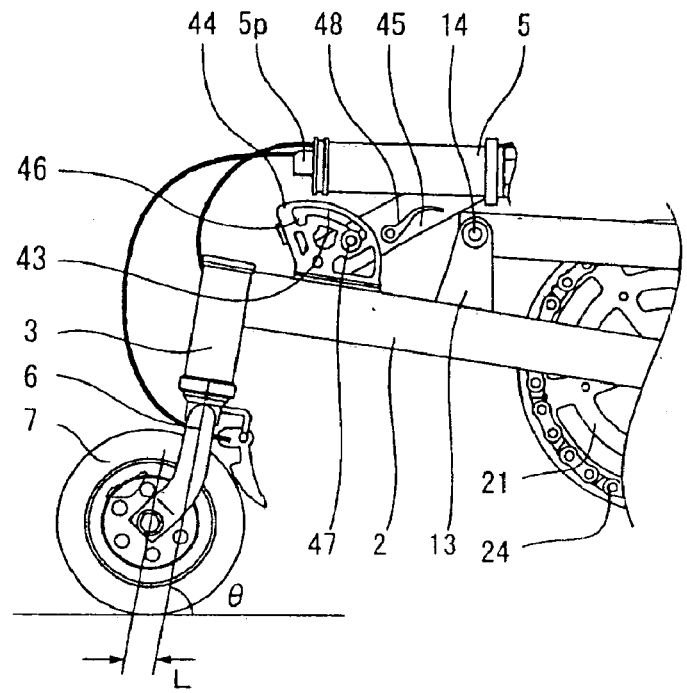
FIG. 4a is a side view showing a main part of a folding bicycle according to Embodiment 2.
Figure 4B:
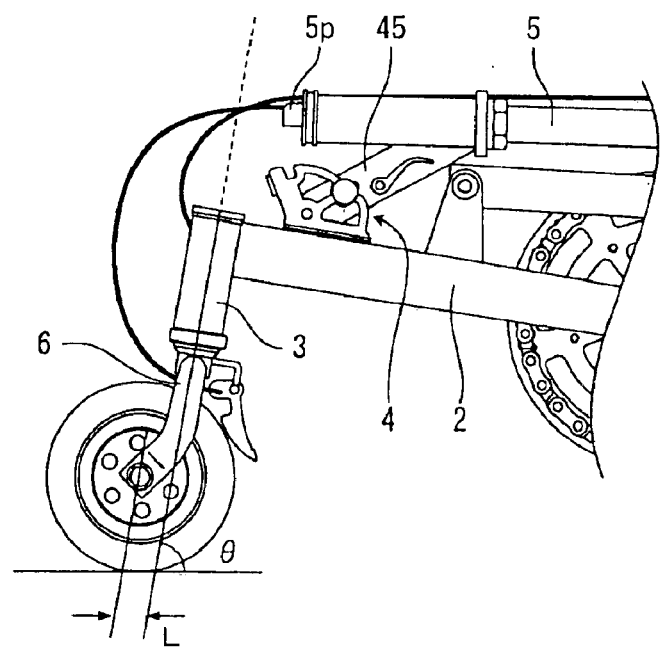
FIG. 4b is a side view showing a main part of the folding bicycle according to another structural example in Embodiment 2.
Figure 5:
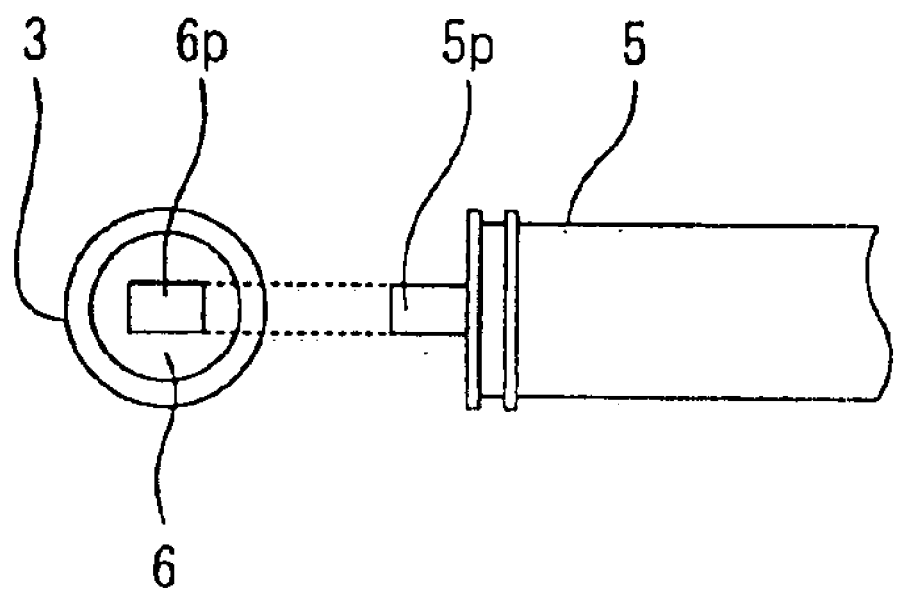
FIG. 5 is a plan view showing a main part of the folding bicycle according to Embodiment 2.

FIGS. 4*a* and 4*b* are side views showing a main part of a folding bicycle according to Embodiment 2, and FIG. 5 is a plan view showing a main part of the bicycle.

The folding bicycle of Embodiment 2 is similar in configuration to that of Embodiment 1 except for the configuration of a supporting part on a front wheel. Thus, the same parts are indicated by the same reference numerals and the detailed explanation thereof will be omitted.

In FIG. 4*a*, the folding bicycle of Embodiment 2 has a head pipe 3 fixed by welding on the front end of a main frame 2 with a fixed caster angle θ. A front wheel fork 6 is supported on the head pipe 3 so as to freely rotate about the shaft.

Further, a handle 5 is mounted on a supporting arm 45 of a hinge member 4 provided on the main frame 2. When the handle 5 is raised, the handle 5 is placed on the same axis as the front fork 6 which is supported by the head pipe 3. Moreover, as shown in FIG. 5, a square insertion hole 6*p* is provided on the upper end face of the front fork 6, and a protrusion 5*p* having a cross-sectional profile engageable to the insertion hole 6*p* is provided on the lower end of the handle shaft 5.

In this embodiment, even when the handle shaft 5 is tilted for folding as shown in FIG. 4*a*, the head pipe 3 and the front wheel fork 6 remain fixed on the main frame 2. Thus, unlike FIG. 2*a*, the front wheel 7 does not expand to the front of the main frame 2, and the storage capacity is reduced accordingly. Further, since the head pipe 3 is welded to the main frame 2, the strength of a body is improved.

FIG. 4*b* shows another structural example in which a member not having a guide groove 43 (FIG. 4*a*) is used as a pivotal-support member 4. Since the configuration of this example is identical to that of FIG. 4*a* except for this point, the same reference numerals are indicated and the detailed description thereof will be omitted.

Figure 6A:
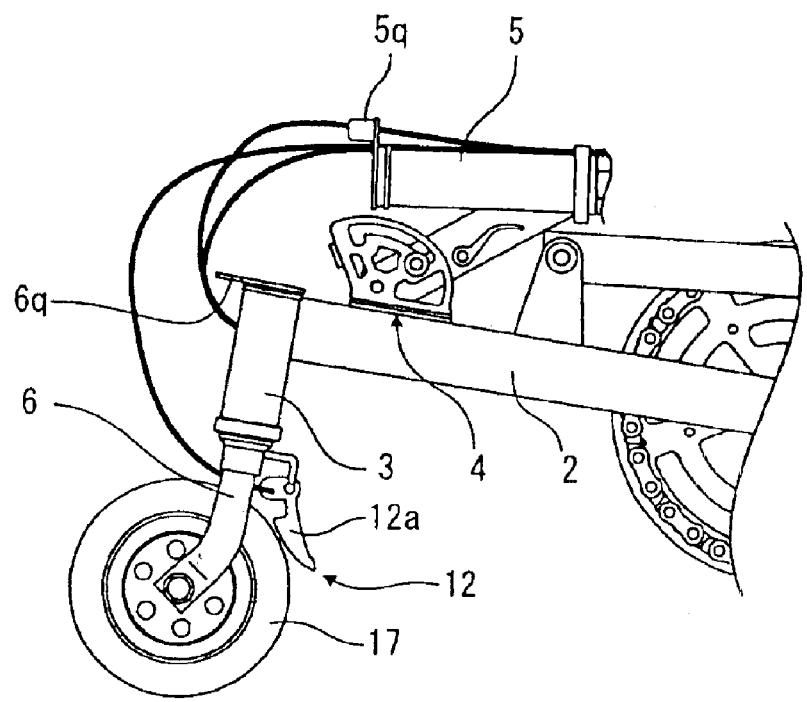
FIG. 6a is an explanatory side view showing an insertion part according to Embodiment 2.
Figure 6B:
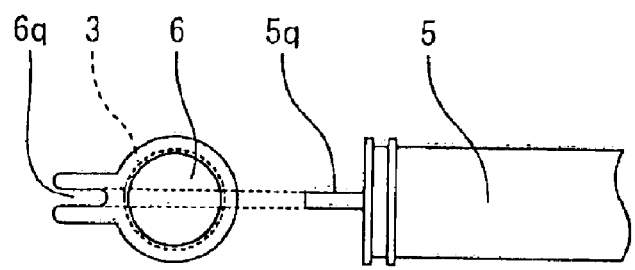
FIG. 6b is an explanatory side view showing an insertion part according to Embodiment 2.

Instead of the configuration having the protrusion 5*p* inserted into the insertion hole 6*p*, as shown in FIGS. 6*a* and 6*b*, a slit 6*q* may be formed so as to protrude in the diameter direction and a claw piece 5*q* may be engaged to the slit 6*q*.

Further, in this case, the claw piece may be provided on the side of the front wheel and the slit groove may be provided on the side of the handle shaft.

Figure 7A:
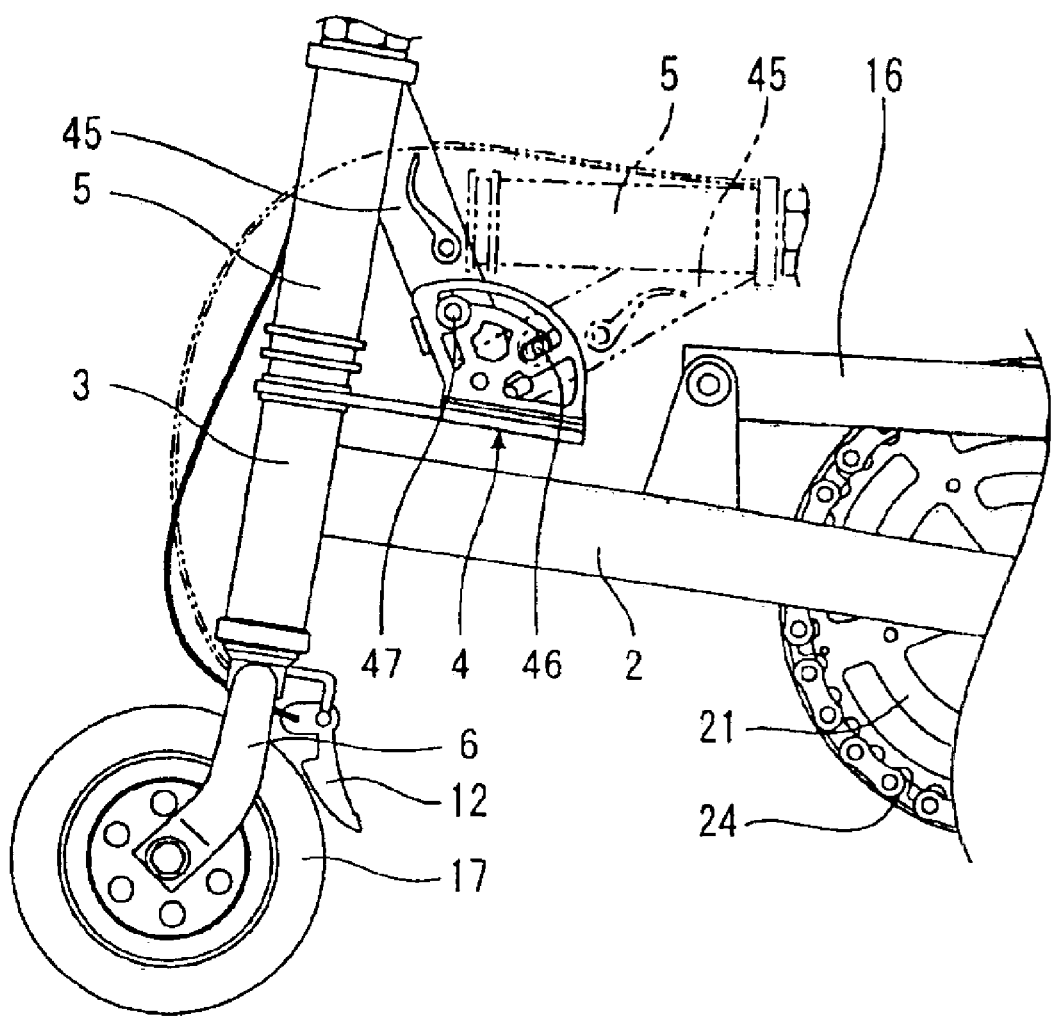
FIG. 7a is an explanatory side view showing an insertion part according to still another structural example in Embodiment 2.
Figure 7B:
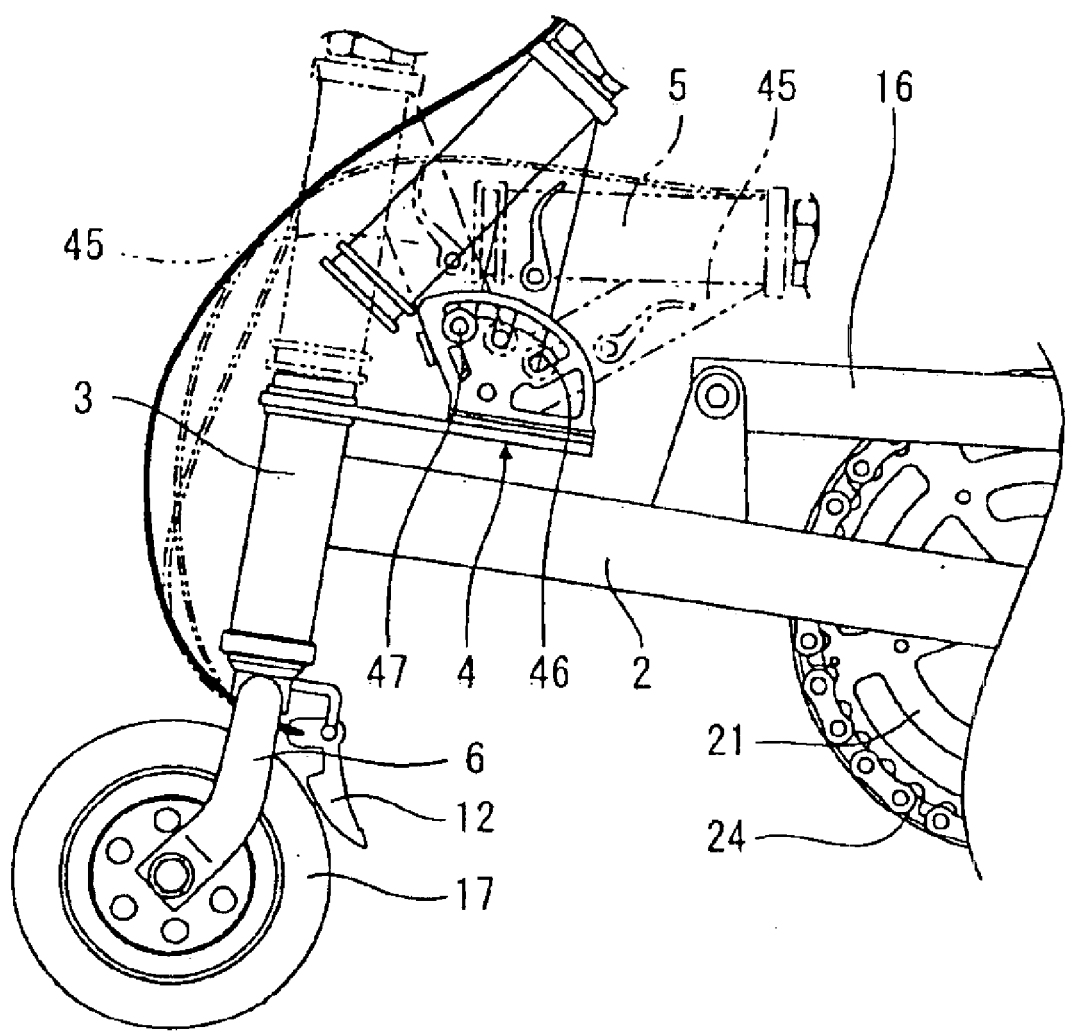
FIG. 7b is an explanatory side view showing an insertion part according to still another structural example in Embodiment 2.

FIGS. 7*a* and 7*b* are side views showing a main part of still another structural example.

In this folding bicycle 1, a pivotal-support member 4 of the handle shaft is connected to a handle shaft 5 on the upper side of a head pipe 3.

In this case, the inserting members of FIG. 5 and FIG. 6*b* are not necessary. Only engagement between a notch 46 and a pin 47 on the pivotal-support member 4 can fix the rising attitude of the handle shaft 5.

In this structural example, in addition to two kinds of attitudes of a rising attitude and a lying attitude when the handle shaft 5 is folded as shown in FIG. 7*a*, three or more notches 46 may be formed on a hinge member so as to fix two or more kinds (two kinds in the illustrated example) of attitudes as rising attitudes, as indicated by chain double-dashed lines and solid lines in FIG. 7*b*. In this case, it is possible to select an angle of inclination according to the body-build of an operator and thus the configuration is convenient.

Figure 7C:
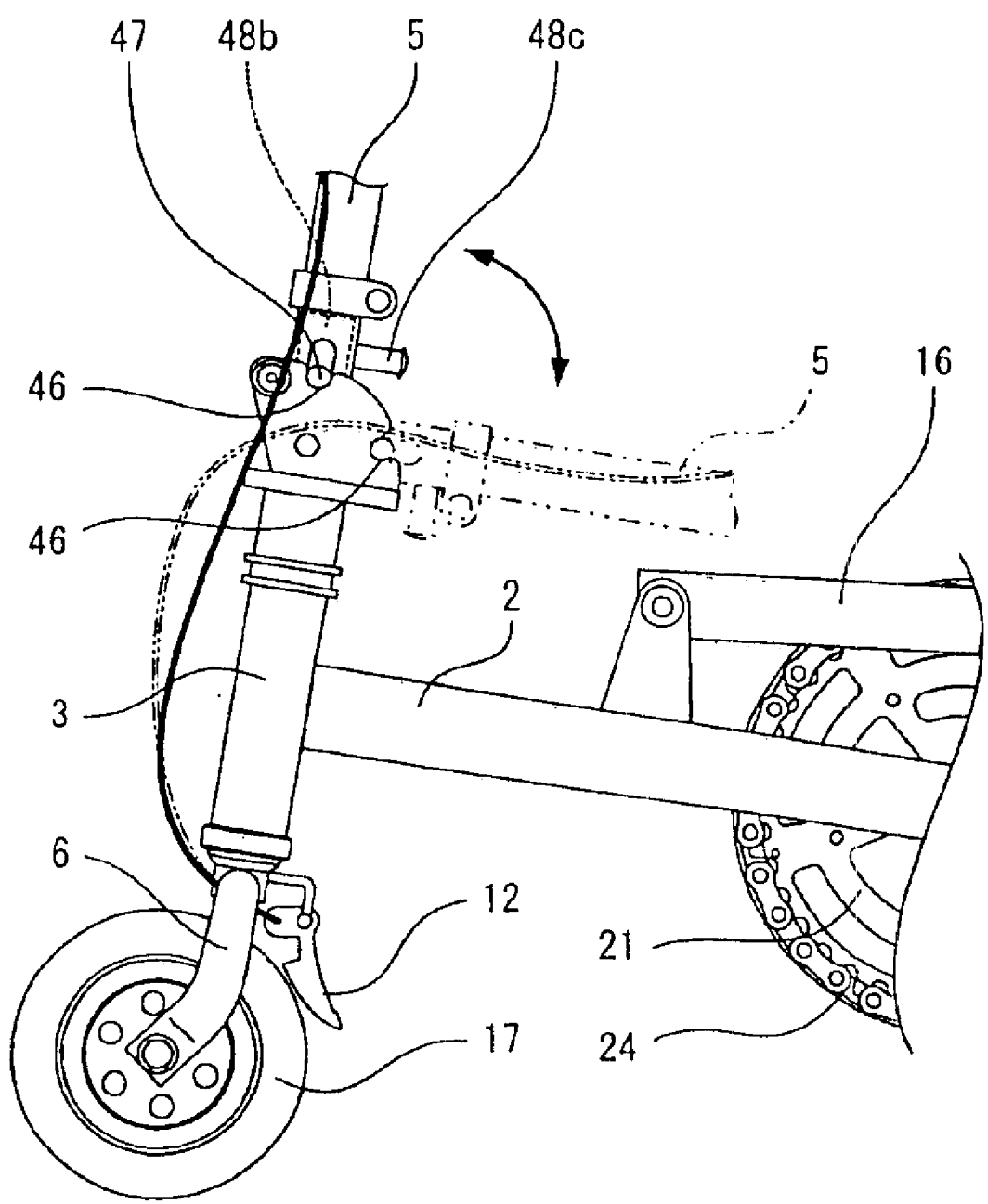
FIG. 7c is an explanatory side view showing a hinge part according to another structural example in Embodiment 2.

Further, as a folding mechanism of the handle shaft 5, as shown in FIG. 7*c*, the handle shaft 5 may be folded by means of the hinge member 4 instead of being supported via the stay.

In this case, as a mechanism for engaging and disengaging the pin 47 to and from the notch 46, the same mechanism as that of FIG. 2*b* may be used. In FIG. 7*c*, the same members as those of FIGS. 7*a* and 7*b* or FIG. 2*b* or the corresponding members are indicated by the same reference numerals and the detailed description thereof will be omitted.

Embodiment 3

Figure 8:
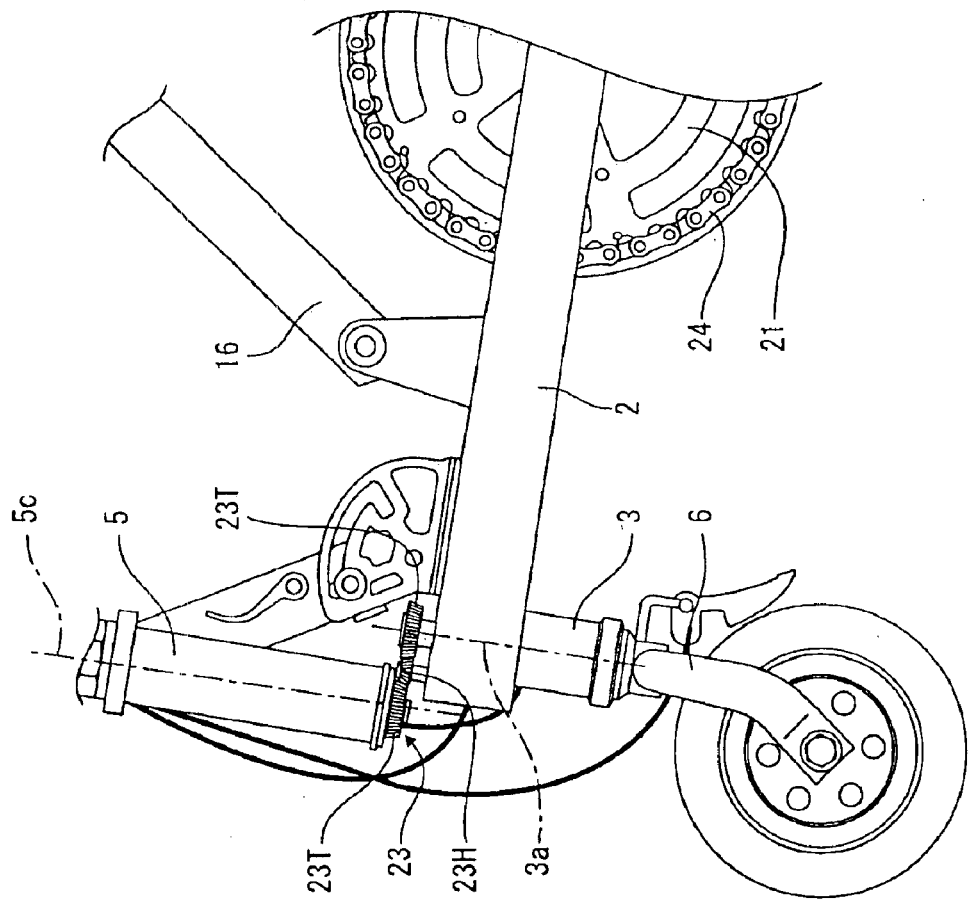
FIG. 8 is a side view showing a main part of a folding bicycle according to Embodiment 3.

FIG. 8 shows a side view showing a main part of a folding bicycle according to Embodiment 3.

The folding bicycle of Embodiment 3 is also similar in configuration to the folding bicycle of Embodiment 1 except for a supporting part of a front wheel. Thus, the same parts are indicated by the same reference numerals and the detailed description thereof will be omitted.

In FIG. 8, in the folding bicycle of Embodiment 3, a shaft 5*c* of a raised handle shaft 5 and a shaft 3*a* of a head pipe 3 are offset. Between the offset shafts, a rotation transmitting mechanism 23 is provided for transmitting the rotation of the handle shaft 5 to a fork 6 rotatably supported by the head pipe 3.

The rotation transmitting mechanism 23 in the illustrated example is a gear mechanism, in which a single intermediate gear 23H is interposed between gears 23T, so that a rotation is transmitted at a rotation ratio of 1:1 in the same direction as the handle shaft 5.

In this case, since it is not always necessary to align the front wheel fork 6 and the handle shaft 5 on the same axis, an overall length when folded can be reduced by positioning the front wheel fork 6 behind the handle shaft 5.

Embodiment 4

Figure 9:
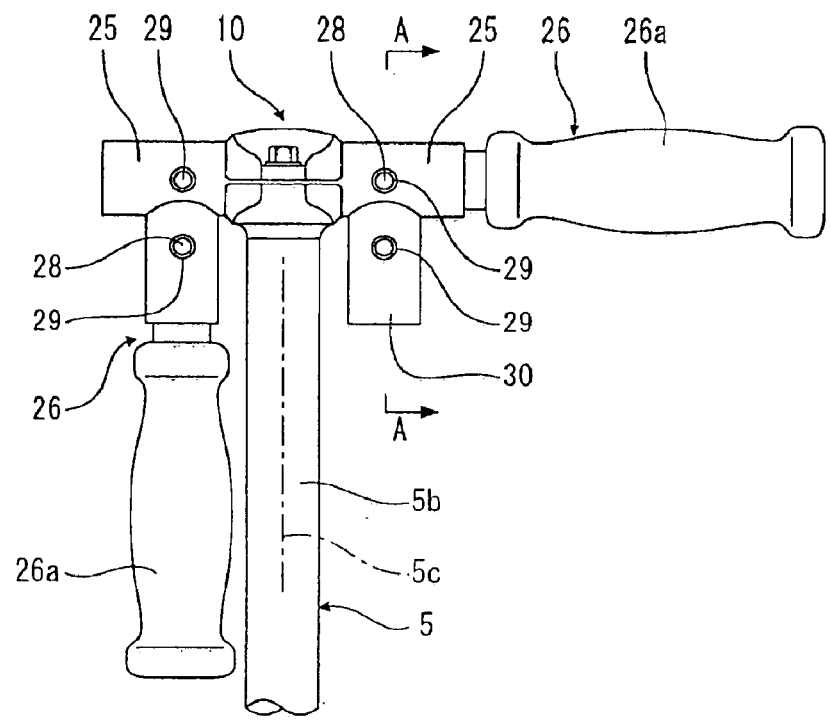
FIG. 9 is a front view showing a main part of a folding bicycle according to Embodiment 4.

FIG. 9 is a front view showing a main part of a folding bicycle according to Embodiment 4.

The folding bicycle of Embodiment 4 is characterized by a handle bar 10, which is applicable to any of Embodiments 1 to 3.

As shown in FIG. 9, a cylindrical socket 25 is provided on the upper end of the handle shaft 5, that is, the upper end of the small-diameter pipe 5*b* so as to intersect like a letter T. A handle member 26 having a holding part 26*a* is fit into the socket 25 and is fixed thereon in an attachable and detachable manner.

Figure 10A:
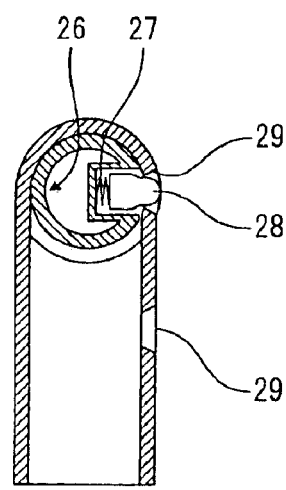
FIG. 10a is a sectional view taken along line A—A in FIG. 9.

As shown in FIG. 10*a*, on a basal portion having the handle member 26 fit into the cylindrical socket 25, a protrusion 28 is provided which is urged by a spring 27 so as to protrude. The protrusion 28 is fit into a fitting hole 29 formed on the cylindrical socket 25, so that the handle member is fixed to prevent the handle member 26 from slipping off.

Then, on a side of the cylindrical socket 25, a storing socket 30 with the same shape is provided so as to have an axis along the handle shaft 5. When folding, as shown in the left side of the figure, the handle member 26 is fixed along the handle shaft 5.

Therefore, when folding, a handle grip 26*a* of the handle does not protrude outwardly to the side of the main frame 2, and thus the bicycle can be stored in a smaller space.

Figure 10B:
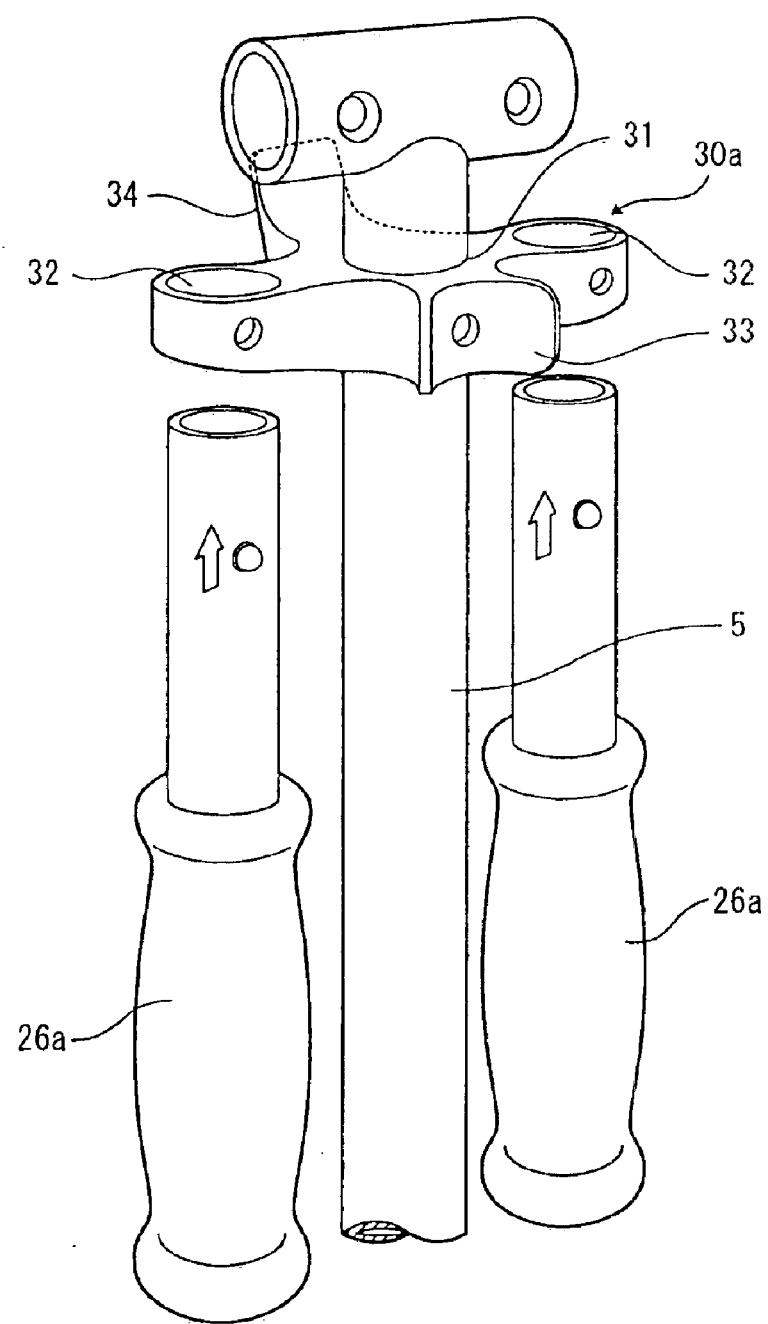
FIG. 10b is a side view showing another structural example in Embodiment 4.

Further, as a storing structure when the handle is folded, the structure of FIG. 10*b* is also applicable. Namely, a storing member 30*a* of FIG. 10*b* is attached to the handle shaft 5 by penetrating the handle shaft 5 through a center hole 31 and fixing the handle shaft 5, through holes 32, 32 which are formed on both sides of the attaching portion. A base portion of a handle grip 26*a* is inserted into the through holes 32, 32.

Moreover, on the rear side of the body in a direction of intersecting the aligning direction of the through holes 32, 32, a receiving portion 33 for the laid saddle post 16 is integrally formed, and a hook 34 for hanging hand baggage and so on is integrally formed on the front side of the body. The hook 34 is made of a material such as a plastic. Therefore, since such a molded body can be attached on the rear, manufacturing can be readily performed.

As described above, the supporting structures of the front wheel 7 and the rear wheel 17 in Embodiments 1 to 4 may be a double bearing type. A cantilever bearing type shown in FIG. 11*a* and later may alternatively be used.

Figure 11A:
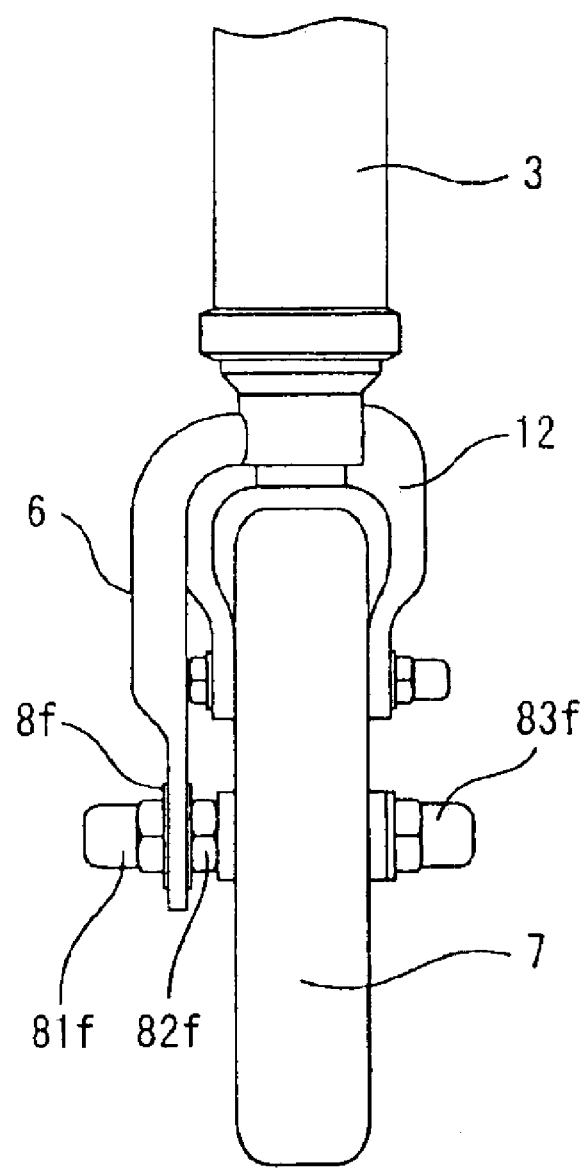
FIG. 11a is an explanatory view showing a cantilever structure of a front wheel and a fastening structure using a cap nut.

FIGS. 11*a* and 1*b* show that a front wheel is a cantilever bearing type, and these figures are partially enlarged views as seen from the rear of the front wheel toward the front.

FIG. 11*a* shows that the lower part of a head pipe 3 has a fork 6 for cantilevering on the left side of the body, an axle 8 is fastened on the distal end of the fork with a cap nut 81*f* and a check nut 82*f*, a front wheel 7 is passed through the cantilevered axle 8, and the front wheel 7 is attached by fastening the cap nut 83*f*. The wheel 7 can be detached by removing the nut 83*f*.

Figure 11B:
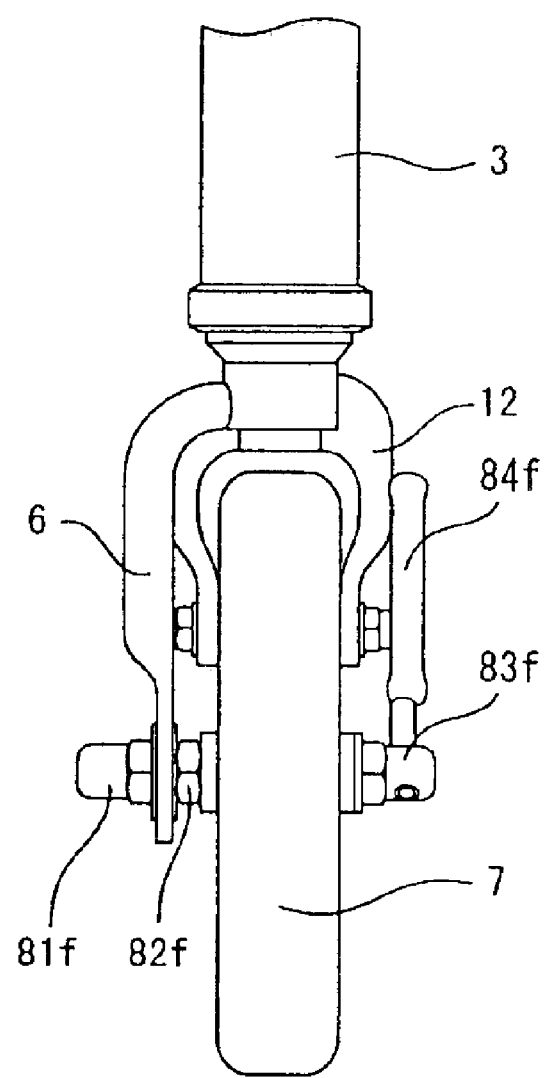
FIG. 11b is an explanatory view showing a cantilever structure of the front wheel and a simple fastening structure using a lever.

FIG. 11*b* shows that an operation lever 84*f* is provided on the nut 83*f* on the side of a free end of the axle, so that the wheel 7 can be detached without using any tools.

Reference numeral 12 in FIGS. 11*a* and 11*b* denotes a brake device for the front wheel. In this case, instead of the brake device 12 shown in FIGS. 7*a* and 8, the brake device is configured such that a rim of a tire 7 is sandwiched by a pair of brake shoes (invisible because hidden behind the tire surface).

Figure 12A:
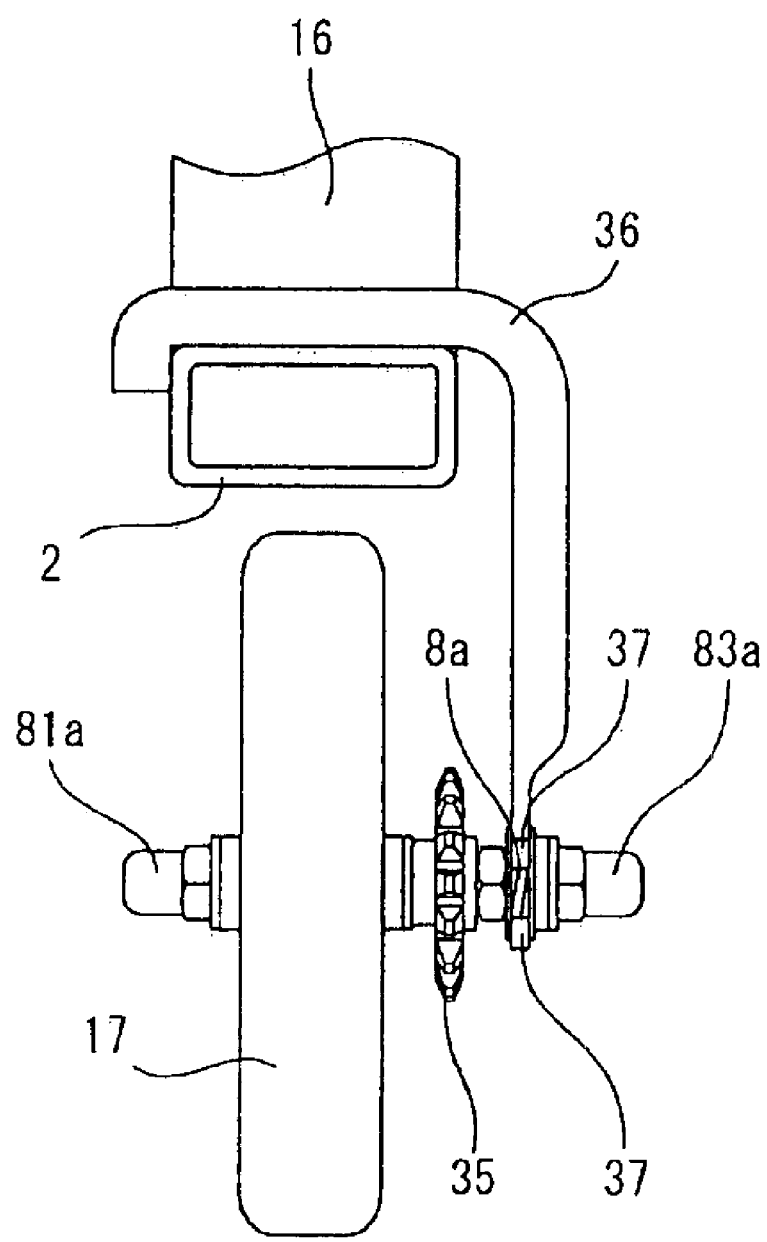
FIG. 12a is another explanatory view showing a cantilever structure of the front wheel and a fastening structure using a cap nut.
Figure 12B:
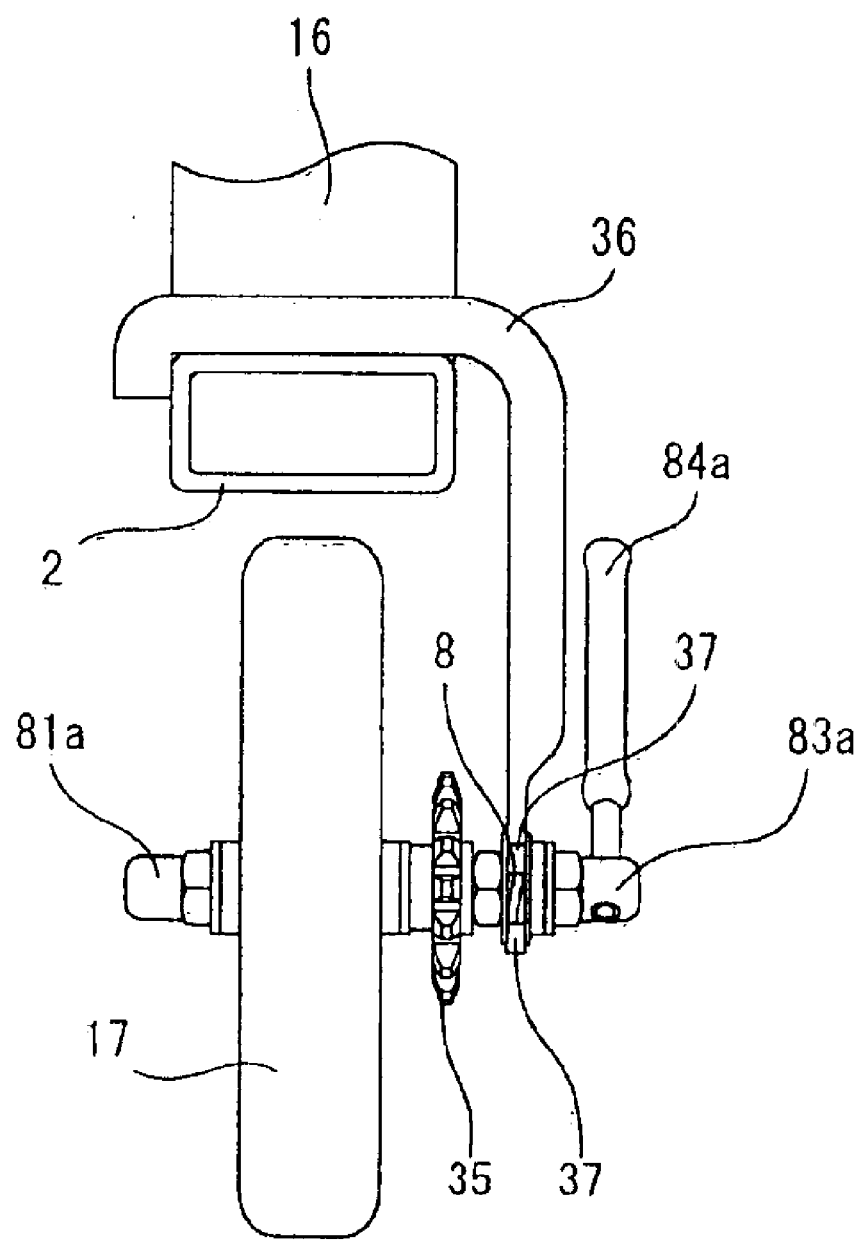
FIG. 12b is another explanatory view showing a cantilever structure of the front wheel and a simple fastening structure using the lever.
Figure 13:
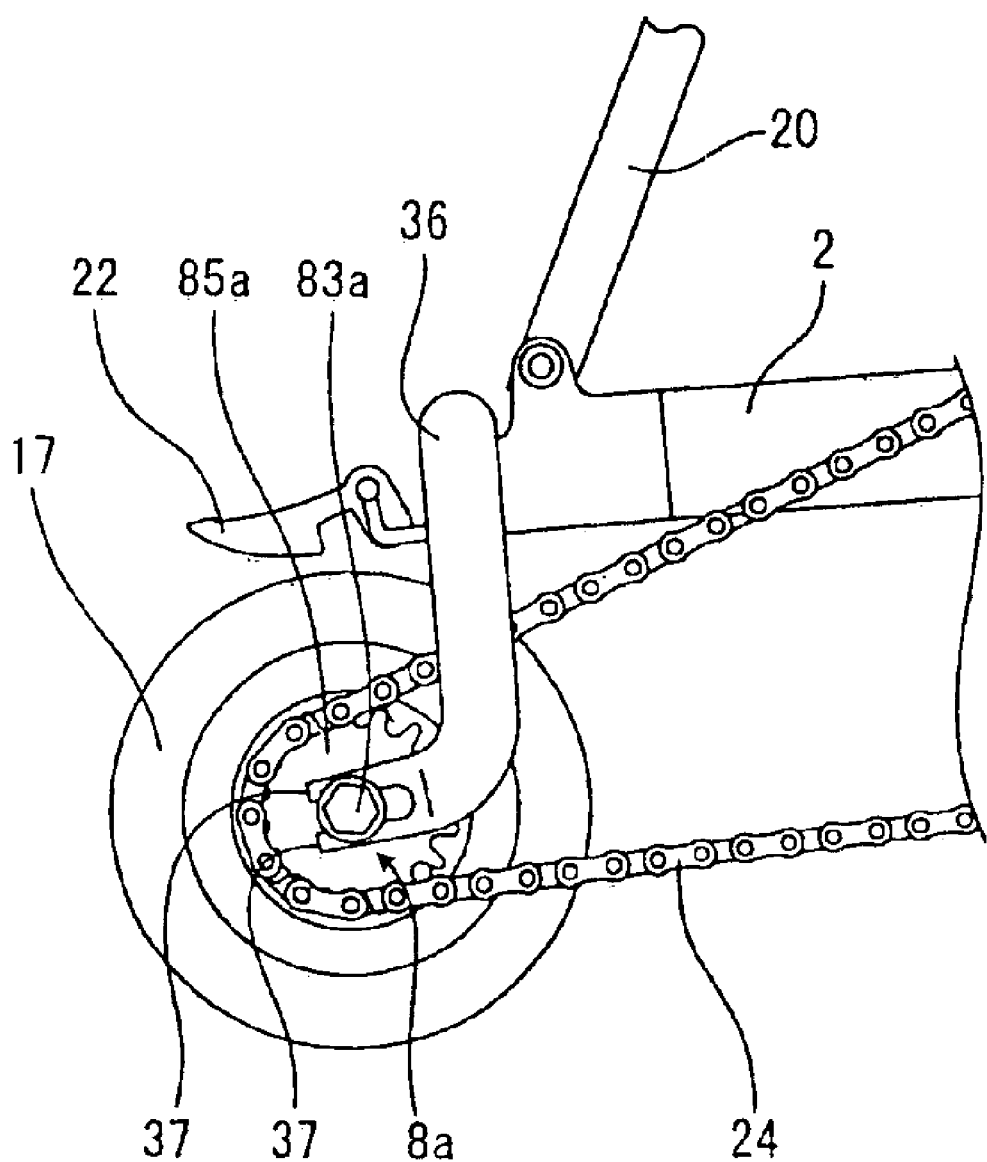
FIG. 13 is a right side view of a rear portion of a body of the folding bicycle according to Embodiment 4.

FIGS. 12*a* and 12*b* are partially enlarged views of a rear wheel as seen from the rear side, in which the rear wheel is a cantilever bearing type, and FIG. 13 is a right side view showing a rear portion of the body.

In FIGS. 12*a* and 12*b* and FIG. 13, a cantilever arm 36 is extended from a main frame 2 and provided on the right of the body, and an axle 8*a* of the rear wheel is fastened on a claw 37 provided on the distal end of the arm 36, with the nut 83*a*.

Since a small gear 85*a* is integrally provided on the rear wheel 17, the axle 8*a*, the rear wheel 17 and the small gear 85*a* can be integrally attached to and detached from the claw 37 (see FIG. 13).

FIG. 12*a* shows that the fastening nut of the axle 8*a* is a cap nut 83*a*. FIG. 12*b* shows that a lever 84*a* is attached to the cap nut 83*a* so that the rear wheel 17 can be attached and detached without any tools.

In this case, when the folding bicycle is folded, the front and rear wheels can be readily detached, so that the storage space can be smaller.

Figure 14A:
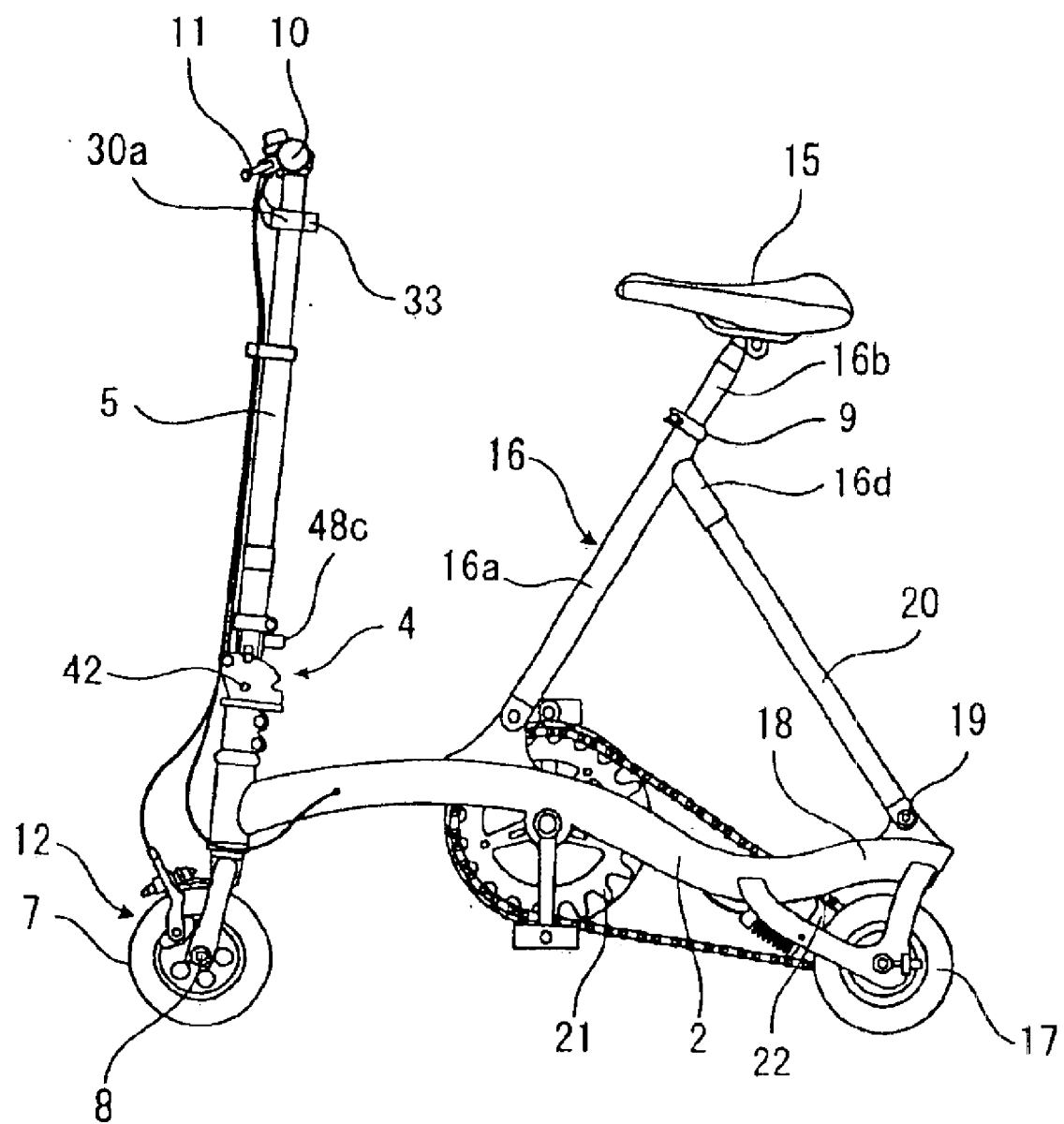
FIG. 14a is an explanatory view showing an example of a folding bicycle varied in design.
Figure 14B:
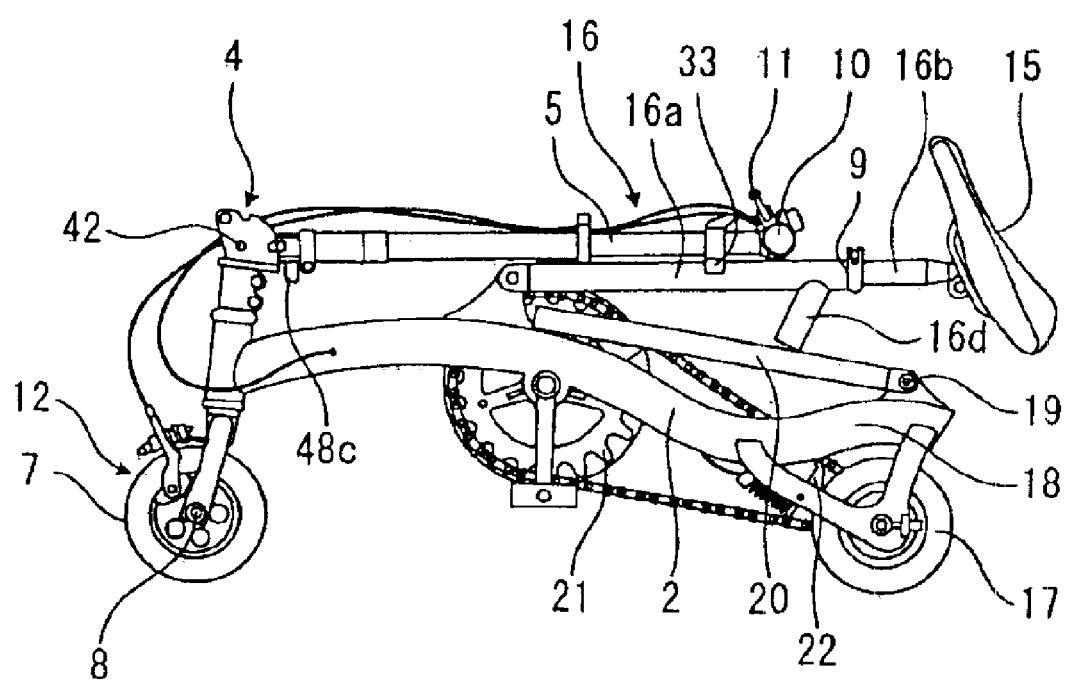

In the embodiments of the folding bicycle, the main frame was shaped like a straight line, but it may be shaped like waves as shown in FIG. 14a, for example. Thus, the shape of the main frame 2 can be changed in view of the design. FIG. 14b shows a folded state of the folding bicycle in FIG. 14a, in which the folded front wheel 7 does not project frontward of the body, and the handle shaft 5 is folded with receiving portion 33 of the storing member 30a being abutted against the saddle post 16, so that both the handle shaft 5 and the saddle post 16 do not come off the right place laterally of the body.

Besides, in the embodiment shown in FIGS. 14a and 14b, only the shape of the main frame is changed and the other constituent elements are the same as those of the above embodiments. Thus, the same members or corresponding members are indicated by the same reference numerals and the detailed description thereof is omitted.

What is claimed is:

1. A folding bicycle comprising:
    a main frame having a front end and a rear end and being integrally formed throughout the entire length of the main frame with no hinge member;
    a head pipe fixed on the front end of the main frame and having a rear side;
    a rear wheel rotatably supported on the rear end of the main frame, said rear wheel having a small gear;
    a handle shaft having a pivotal-support member for allowing the handle shaft to be folded, and said handle shaft being insertable into and supported by the head pipe;
    a front wheel fork supported by the head pipe;
    a front wheel rotatably mounted to the front wheel fork;
    a saddle post having a saddle on top thereof, said saddle post having a pivotal support portion for pivotal support on the main frame on the rear side of the head pipe;
    a rod-shaped stay having no hinge member, said stay having a top end detachably fixed to the saddle post at a position beneath the saddle, and said stay having a front end detachably fixed to the saddle post at a position beneath the saddle on the rear side of the main frame and a pivotal-support portion for connecting the stay to the rear side of the main frame;
    a crank gear rotatably supported on the main frame between the pivotal-support portion of the saddle post and the pivotal-support portion of the stay; and
    a chain looped over the crank gear and said small gear of the rear wheel,
    wherein the stay can be folded over the main frame and the saddle post can be folded along the main frame over the stay, and thereafter the handle shaft can be folded over the saddle post, the stay and the main frame in an overlaid manner.

2. The folding bicycle according to claim 1, wherein the crank gear mounted on the main frame is positioned rearward of an intermediate point between the front wheel and the rear wheel.

3. The folding bicycle according to claim 1, further comprising cylindrical sockets for fixing a handle, the sockets intersecting an upper end of the handle shaft in a manner of shaping a T, storing sockets attached to each side of the cylindrical sockets to extend along an axis in parallel with the handle shaft, and a handling member which has a grip and can be detachably attached to each of the socket.

4. The folding bicycle according to claim 1, further comprising a brake on each of the front wheel and the rear wheel, each brake having a brake shoe for contacting the wheel from outside, the brake shoe being provided to be rotatable about a shaft in parallel with rotation axes of the front wheel and the rear wheel, the brake shoe being pressed and contacted on an outer peripheral surface of each of the front wheel and the rear wheel by rotating in a direction opposite to a rotating direction of the front wheel and the rear wheel.

5. The folding bicycle according to claim 1, further comprising:
    a guide block having a center having a pivot point, said guide block having a circumferential surface, said surface having a plurality of notches formed thereon,
    wherein the pivotal-support member comprises a slider being slidable along the handle shaft, said slider having an operation knob, and said pivotal support member further comprises a pin protruded on a side of the slider and a spring for applying a spring force to the slider, said pin fitting into any one of said plurality of notches, thereby constantly urging the slider toward the notch fitted by the pin and moving the operation knob against urging force of the spring, whereby the pin is disengaged from the notch and the handle shaft is allowed to rotate.

* * * * *